W. A. SLOPER.
HOP TRELLIS WIRE DROPPER.
APPLICATION FILED AUG. 3, 1908.

934,023.

Patented Sept. 14, 1909.

WITNESSES:
John Stevenson
Chas. B. Stevenson

Willard Arch Sloper
INVENTOR.

BY
Maxwell Stevenson
ATTORNEY.

UNITED STATES PATENT OFFICE.

WILLARD ARCH SLOPER, OF INDEPENDENCE, OREGON.

HOP-TRELLIS-WIRE DROPPER.

934,023.

Specification of Letters Patent.  Patented Sept. 14, 1909.

Application filed August 3, 1908. Serial No. 446,796.

*To all whom it may concern:*

Be it known that I, WILLARD ARCH SLOPER, a citizen of the United States, residing at Independence, in the county of Polk and State of Oregon, have invented certain new and useful Improvements in Hop-Trellis-Wire Droppers, of which the following is a specification.

This invention relates to hop trellis wire droppers and has for its object to provide means for removing the under cross-wires, which hold up the hop vines, from hooks attached to the upper main wires.

Another object is to combine with the wire dropper a knife for the purpose of cutting off vines or strings.

Figure 1:
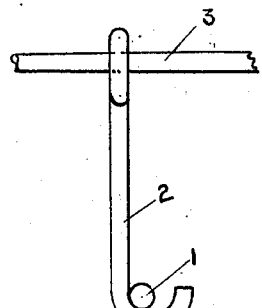
Figure 2:
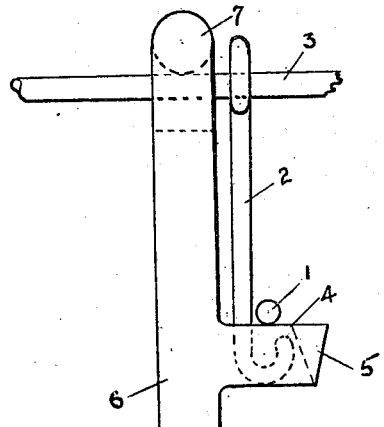
Figure 3:
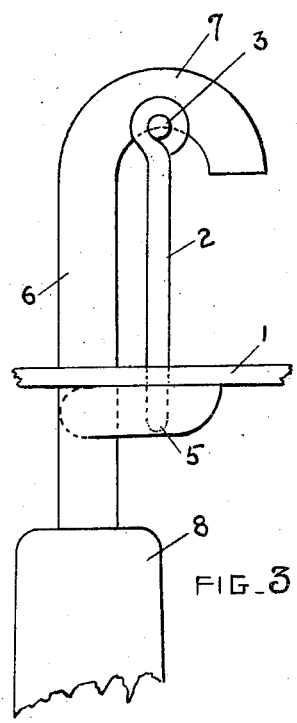
Figure 4:
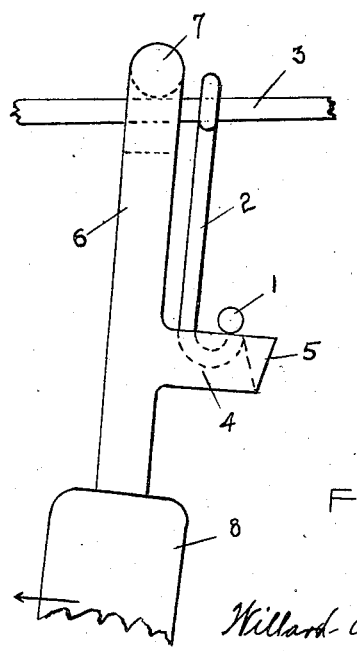

In the drawings forming a part of this specification and in which like numerals of reference indicate similar parts in the several views, Figure 1 shows the cross wire before being removed. Fig. 2 shows the wire dropper in place. Fig. 3 is another view showing the wire dropper in place. Fig. 4 shows the cross wire removed from the hook.

Referring to the drawings, the under cross wire 1 is held up when in use, by a hook 2 attached to main wire 3. A rod 6 is fastened to the upper end of a pole 8 and is hook-shaped at 7. A projection 4 extends from and is a part of rod 6. A knife-shaped blade 5 extends from and is a part of 4 and sets at right angles to it as shown in Figs. 2, 3, and 4 and is used for the purpose of cutting off vines, etc.

In use, part 4 is placed under wire 1 and then lifted so that hook 7 can be placed over wire 3, at the same time raising wire 1 to the position shown in Figs. 2 and 3. Pole 8 is then swung in direction of arrow in Fig. 4 thus removing the hook 2 from under cross wire 1 and allowing said cross wire 1 to drop out.

What I claim is:

A hop trellis wire dropper comprising a shank formed at one end into a hook, a projection extending laterally from the shank at an angle to the hook and spaced therefrom and maintaining a suitable cutting edge, and a handle secured to the other end of the shank.

In testimony whereof I affix my signature, in presence of two witnesses.

WILLARD ARCH SLOPER.

Witnesses:
A. J. MATTER,
M. MOREHEAD.